United States Patent
Byrnes

(10) Patent No.: US 6,560,887 B2
(45) Date of Patent: May 13, 2003

(54) TOOLS FOR PIPE ANGLE MEASUREMENT AND MARKING

(76) Inventor: Dennis S. Byrnes, 113 Yale Ave., Lancaster, PA (US) 17603

( * ) Notice: Subject to any disclaimer, the term of this patent is extended or adjusted under 35 U.S.C. 154(b) by 0 days.

(21) Appl. No.: 09/755,459

(22) Filed: Jan. 5, 2001

(65) Prior Publication Data

US 2002/0088132 A1 Jul. 11, 2002

(51) Int. Cl.$^7$ ................................................. G01B 3/56
(52) U.S. Cl. .......................... 33/534; 33/529; 33/538; 33/679.1; 33/562
(58) Field of Search ................ 33/1 G, 1 N, 412, 33/465, 471, 755, 759, 529, 534, 538, 679.1, 562, 563, 566

(56) References Cited

U.S. PATENT DOCUMENTS

| | | | |
|---|---|---|---|
| 791,397 A | 5/1905 | Asbury | |
| 872,331 A | 12/1907 | Dreier | |
| 913,366 A | 2/1909 | Donnelly | |
| 962,621 A | 6/1910 | Carlson | |
| 1,152,974 A | 9/1915 | Rice | |
| 1,566,002 A | 12/1925 | Hess | |
| 1,572,303 A | 2/1926 | Millspaugh | |
| 1,911,311 A | 5/1933 | Ernst | |
| 1,960,557 A | 5/1934 | Snyder | 137/75 |
| 2,449,265 A | 9/1948 | Williams | 138/49 |
| 2,449,754 A | 9/1948 | Seitz | 285/111 |
| 2,654,619 A | 10/1953 | Gaum | 285/179 |
| 2,664,633 A * | 1/1954 | Reich | 33/759 |
| 2,979,825 A * | 4/1961 | Westbrook | 33/679.1 |
| 4,418,477 A * | 12/1983 | Montgomery | 33/755 |
| 4,535,542 A * | 8/1985 | Liu et al. | 33/1 N |
| 4,652,017 A | 3/1987 | Drechsel | 285/5 |
| 4,660,293 A * | 4/1987 | Kovacs | 33/1 N |
| 4,771,548 A * | 9/1988 | Donnery | 33/534 |
| 4,965,943 A * | 10/1990 | Adams | 33/759 |
| 5,054,513 A | 10/1991 | Trueb et al. | 137/375 |
| 5,531,028 A * | 7/1996 | Flippen | 33/758 |
| 6,105,268 A * | 8/2000 | Vaughn et al. | 33/471 |
| 6,330,752 B1 * | 12/2001 | Ellam | 33/471 |

FOREIGN PATENT DOCUMENTS

| | | |
|---|---|---|
| AU | 44109/72 | 1/1974 |
| FR | 2 608 726 | 6/1988 |
| GB | 691942 | 5/1953 |
| GB | 1 403 780 | 8/1975 |
| IT | 538451 | 1/1956 |
| JP | 6-66395 | 3/1994 |

OTHER PUBLICATIONS

U.S. patent application Ser. No. 08/969,423, Byrnes, filed Sep. 1, 1997.

* cited by examiner

*Primary Examiner*—Christopher W. Fulton
*Assistant Examiner*—Yaritza Guadalupe
(74) *Attorney, Agent, or Firm*—Drinker Biddle & Reath LLP

(57) ABSTRACT

A pipe angle measuring tool and pipe angle marking tool are defined. A template is also defined which is a flexible substrate, such as paperboard, on which images of the tools are printed. A user may create the tools by cutting them out of the paperboard with ordinary scissors or by separating lines of weakness provided in the substrate. The tools are useful in measuring an angle between two pipes and marking the angle on a part of a selectable angle pipe elbow. The template is inexpensive to produce and can, therefore, be provided to purchasers of selectable angle pipe elbows at little or no charge to the purchaser.

25 Claims, 6 Drawing Sheets

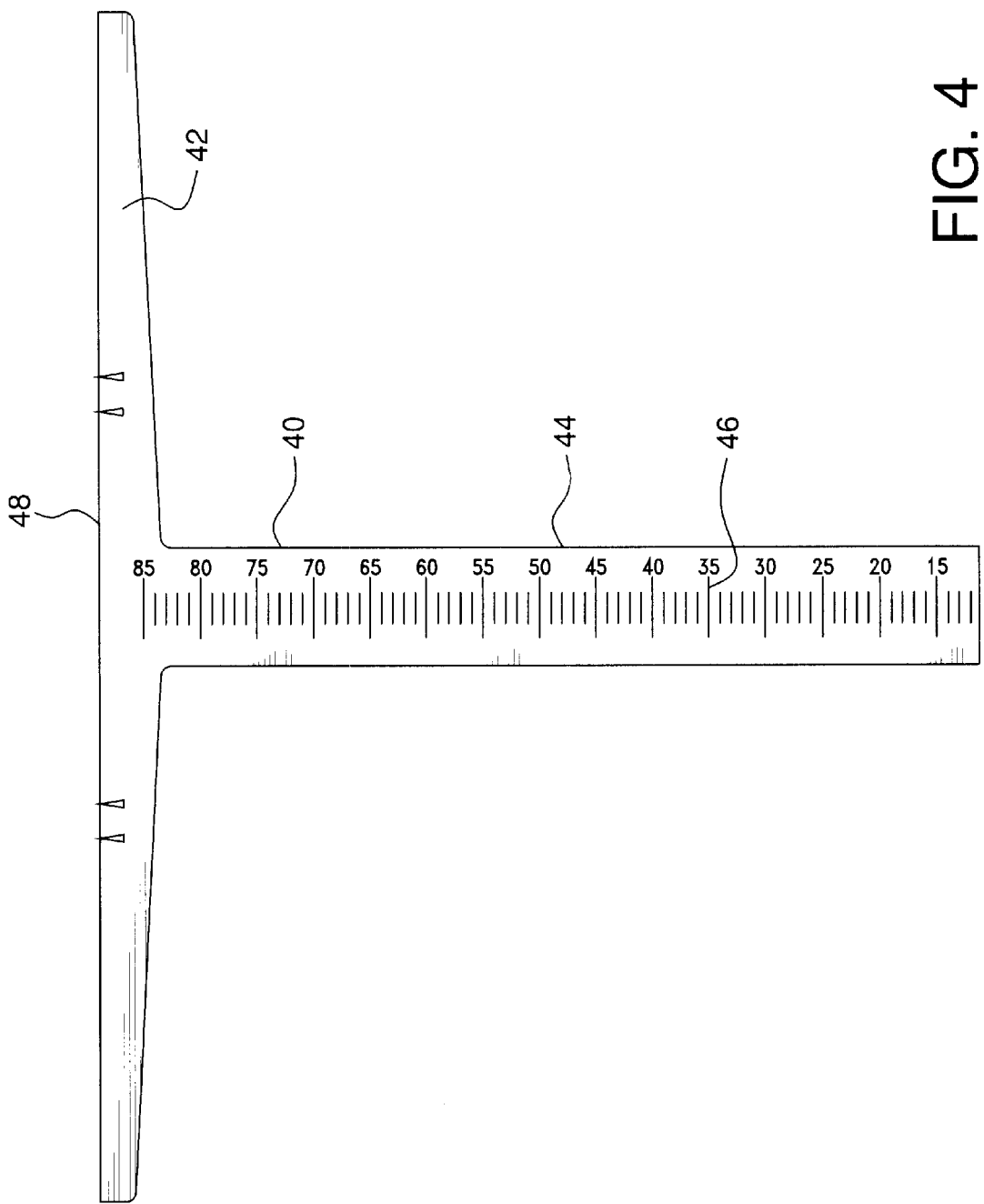

TOOLS FOR PIPE ANGLE MEASUREMENT AND MARKING

FIELD OF THE INVENTION

The invention is in the field of pipe fittings, specifically pipe elbows and pipe connections and the measurement and marking thereof.

BACKGROUND OF THE INVENTION

Most piping installations require changes of direction. With rigid pipe, the change in direction is effected with elbow-type fittings which attach to lengths of straight pipe. Conventional pipe elbows are available in fixed angular increments, typically ⅛ bend increments (90, 45, 22½ degrees). When a pipe layout requires an intermediate angular displacement, the pipe fitter finds himself in a difficult situation.

In some specific situations, provision is made for selecting a specific angular displacement. For example, U.S. Pat. No. 2,654,619 to Guam, describes a reducing elbow for welded pipe, part of which has constant radius of curvature and diameter. The pipe fitter can sever the elbow at the desired point and weld it into his run of pipe. Two cuts are required to be made exactly perpendicular to the axis of curvature to provide a weldable fit to the mating piece of pipe. Williams U.S. Pat. No. 2,449,265 provides a rubber automobile radiator hose which can be cut along lines marked to agree with specific automobile models. The hose depends on its elasticity at the cut end for attachment to the car radiator.

Certain inventions have been recently developed to fill the need for a pipe elbow which can be adapted to whatever angular displacement is required for a pipe installation. One such invention is that disclosed by the U.S. patent application Ser. No. 08/969,423, filed Nov. 1, 1997 in the name of Byrnes, incorporated herein by reference.

Now having a pipe elbow which can be adjusted to most any angle, the pipe fitter requires tools to effectively measure the required angle and mark the pipe to be cut. It may be common for the pipe fitter to find herself in a position where she must measure the angle and mark the pipe when appropriate tools are not available. It is essential that tools be handily available and convenient to a pipe fitter, who frequently does not carry such tools about.

DEFINITIONS

The following terms are used herein as defined:

Proximal means the end of a pipe fitting to be connected to a run of pipe.

Distal refers to the end of a pipe fitting farthest from a run of pipe after it has been joined thereto.

SUMMARY OF THE INVENTION

The invention is directed to a means for measuring an angle between two pipes within a pipe system and for marking a selectable angle pipe elbow for proper cutting such that the elbow will fit therein.

The invention comprises tools, including an angle measuring tool and an angle marking tool. The angle measuring tool is formed from a measuring base and a measuring slide, the measuring base and measuring slide each have a point where the two may be pivotally connected. Preferably, each are provided with a tab which fits snugly into the opening of a standard pipe. When the measuring slide and measuring base are pivotally connected with each other, and the tabs of each are inserted into the ends of two respective pipes, a user may conveniently determine the angle between the two pipes by comparing the position of an edge of the measuring slide to graduations on the measuring base.

The angle marking tool comprises a wrapping band and a graduated strip transversely connected thereto. The pipe fitter matches the graduation corresponding with the angle read from the measuring base with the end of a selectable angle elbow part. The graduated strip is then laid along an outside aspect of the elbow part. Once in place, the wrapping band may be wrapped around the periphery of the elbow part, providing the pipe fitter with a guide for easy marking of the proper cutting point.

In one embodiment, the invention is directed to a kit, preferably a template from which angle measuring and marking tools can be created. The template may be a flexible substrate, such as paper, from which a pipe fitter can cut out the tools. It is contemplated that the template be inexpensive to manufacture such that it can be provided to purchasers of selectable angle pipe elbows at little or no charge to the purchaser. In this way, the pipe fitter will never find herself in a position of not having the tools to properly measure and mark the required angle.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 4 is a plan view of an angle marking tool.

DETAILED DESCRIPTION OF THE DRAWINGS

Figure 1:
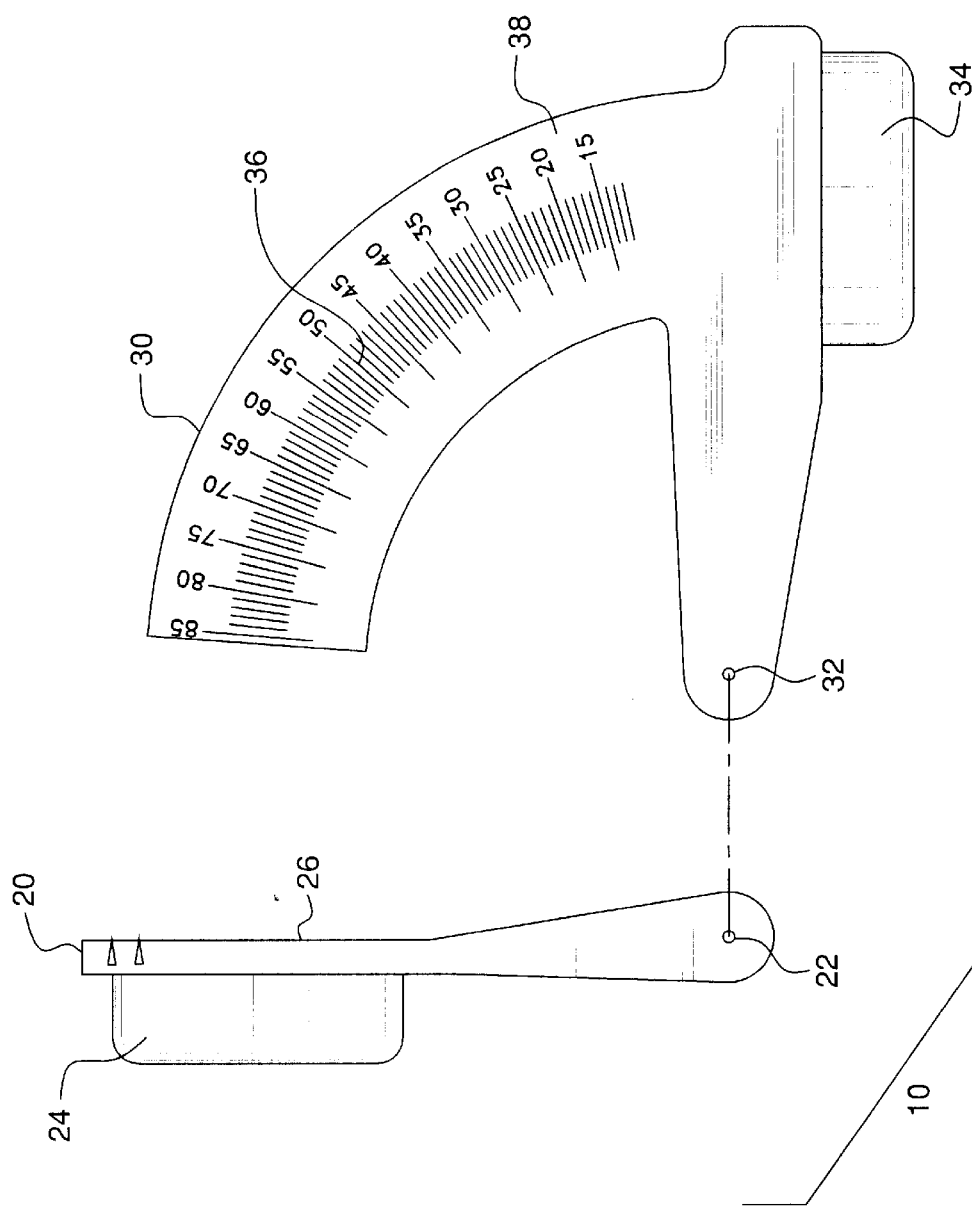
FIG. 1 shows a plan view of a pipe angle measuring device.

In the drawings, wherein like numerals identify like elements, there is shown a tool generally identified by the numeral 10 for measuring the angle between pipes and a tool for pipe marking generally identified by the numeral 40.

The angle measuring tool 10 and the angle marking tool 40 are intended for use in measuring and marking pipe elbows. The pipe elbows best suited for use with the current invention are elbows designed to be cut to a required angle. An ideal elbow is that disclosed in the U.S. patent application Ser. No. 08/969,423, filed Nov. 1, 1997 in the name of Byrnes, incorporated herein by reference. The preferable pipe elbow comprises two parts, each with a proximal, or upstream end, and a distal, or downstream end. The proximal end of the first elbow part and the distal end of the second elbow part are contemplated to accommodate standard pipes and fittings. The distal end of the first part has a constant radius of curvature which fits into the proximal end of the second elbow part. The second elbow part has the same radius of curvature as the first elbow part. The first elbow part can be precut to a desired included angle within a pipe system and inserted into the proximal end of the second elbow part. An internal stop is provided within the second elbow part. The distal end of the first elbow part is inserted into the second part until it bottoms against or abuts the stop, providing an elbow of fixed included angle.

FIG. 1 shows the angle measuring tool 10 which comprises a measuring slide 20 and a measuring base 30. The angle measuring tool 10 may be formed from any material having adequate stiffness such that it will substantially maintain its shape when free of external manipulation. Such materials include metal, plastic and paper. Measuring slide 20 has an aligning point 22. The aligning point 22 may be any means by which a pivotal connection can be formed, such as a small hole through which an elongated element may be placed. The alignment point 22 may also be a printed mark, or a scored or perforated area through which a hole can be easily punched. Measuring slide 20 is provided with a protruding tab 24. The tab 24 is shaped to fit inside the end of a run of pipe. In a preferred form of the invention, designed for use with a 1½ inch pipe system, the tab 24 is 1 and ⅝ inches long and about one half inch wide. (The inner dimension of a 1½ inch pipe may be between about 1.4 and about 1.6 inches.) The tab will, therefore, fit snugly within the standard 1½ inch pipe. A side of the measuring slide 20 opposite the tab 24 forms a measuring edge 26.

The measuring base 30 has an aligning point 32, similar to aligning point 22 of the measuring slide 20. The measuring base 30 is also provided with a tab 34, similar to tab 24. Tab 34 preferably has the same length and width as tab 24 such that it too will fit snugly within the end of a standard pipe. The measuring base 30 is further provided with graduations 36 from which an angle can be read. The graduations 36 are spread in a radial pattern, preferably on an arcuate segment 38, the arcuate segment 38 extending away from tab 34. In a preferred embodiment, the graduations 36 run from about 10 degrees nearest the tab 34 to about 85 degrees farthest from tab 34.

Figure 3:
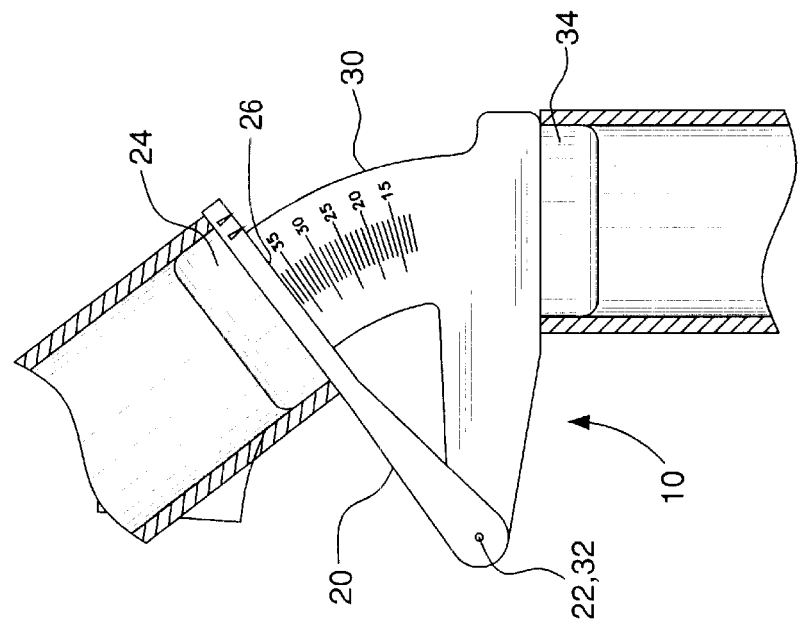
FIG. 3 shows a pipe measuring device associated with two pipes disposed at less than a 90 degree angle.

The measuring slide 20 and measuring base 30 are assembled to form measuring tool 10 by aligning the alignment points 22, 32. Once aligned, an elongated element (not shown) is placed through both alignment points 22, 32, thereby pivotally connecting measuring slide 20 and measuring base 30 to form a complete measuring tool, as seen in FIGS. 3 and 4. The elongated element may be a rivet or pin provided with the measuring tool by the manufacturer or a common nail, pin or screw, or any other ordinary elongated thing commonly found around areas where pipes are laid.

Figure 2:
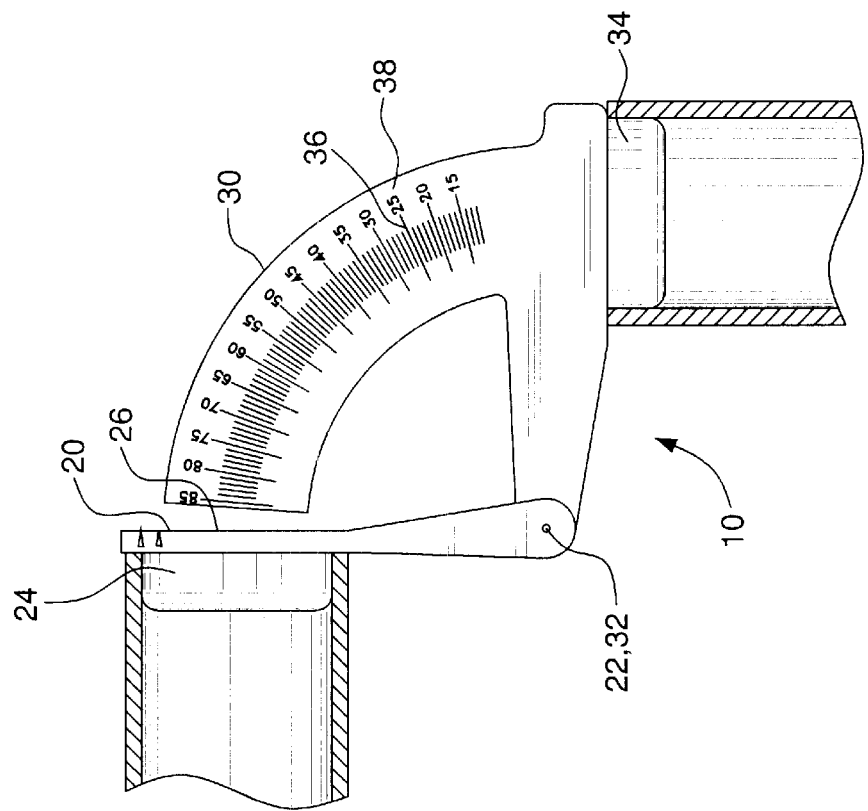
FIG. 2 shows a pipe measuring device associated with two pipes disposed at a 90 degree angle.

FIGS. 2 and 3 show the measuring tool 10 being used to measure angles between pipes (the pipes being shown in longitudinal cross section). The tab 24 is inserted into the end of the first pipe. At the same time, the tab 34 is inserted into the end of the second pipe. With a nail pivotally connecting measuring slide 20 and measuring base 30, the two parts form a complete measuring tool 10. The angle of the two pipes under analysis may be measured at the point where the measuring edge 26 of the measuring slide 20 meets a particular graduation 36 on the measuring base 30. The two pipes shown in FIG. 2 form an angle of roughly 90 degrees. A graduation 36 showing a 90 degree angle may be included in less preferred embodiments of the invention. However, in the preferred embodiment, the 90 degree angle graduation need not be included because the most preferable selectable pipe elbow with which use of the invention is currently contemplated is preformed at a 90 degree angle. No measuring, marking or cutting is necessary in this embodiment for pipes forming a 90 degree angle.

The two pipes shown in FIG. 3 form roughly a 37 degree angle. The graduation corresponding with 37 degrees is visible where the measuring edge 26 meets the graduations 36. The preferred embodiment of the invention is highly useful in measuring the angle.

Once the angle between the two pipes is known, the pipe fitter may use angle marking tool 40 to mark a cutting line around the periphery of the first elbow part of a selectable angle elbow in order to ultimately form an elbow with the required angle. One embodiment of the angle marking tool 40 is shown in FIG. 4. The angle marking tool 40 comprises a wrapping band 42 and a graduated measuring strip 44 transversely connected thereto. The wrapping band 42 is formed from two transverse tabs adapted to engage the elbow so that the graduations on the measuring strip position along the spine (the outside of the surface of the elbow defining the longest arc length) of the elbow part to be cut. The angle marking tool may be formed from a number of acceptable materials. However, the wrapping band 42 must be flexible. It is preferable that the measuring strip 44 also be flexible. Alternatively, the measuring strip 44 may be formed in the shape of the outside surface of a pipe elbow with which it is intended to be used (described below). For reasons of economy, it is preferred to form the entire measuring tool from a single material such as paper, chipboard, cardboard, flexible plastic, foil or the like.

Graduations 46 are provided on the measuring strip 44 which correspond with the graduations 36 on the arcuate segment 38 of the measuring base 30, preferably running from about 10 degrees at its end farthest from the wrapping band 42 to about 85 degrees at its end closet to wrapping band 42.

The edge of the wrapping band 42 opposite the measuring strip 44 comprises a marking edge 48.

Figure 5:
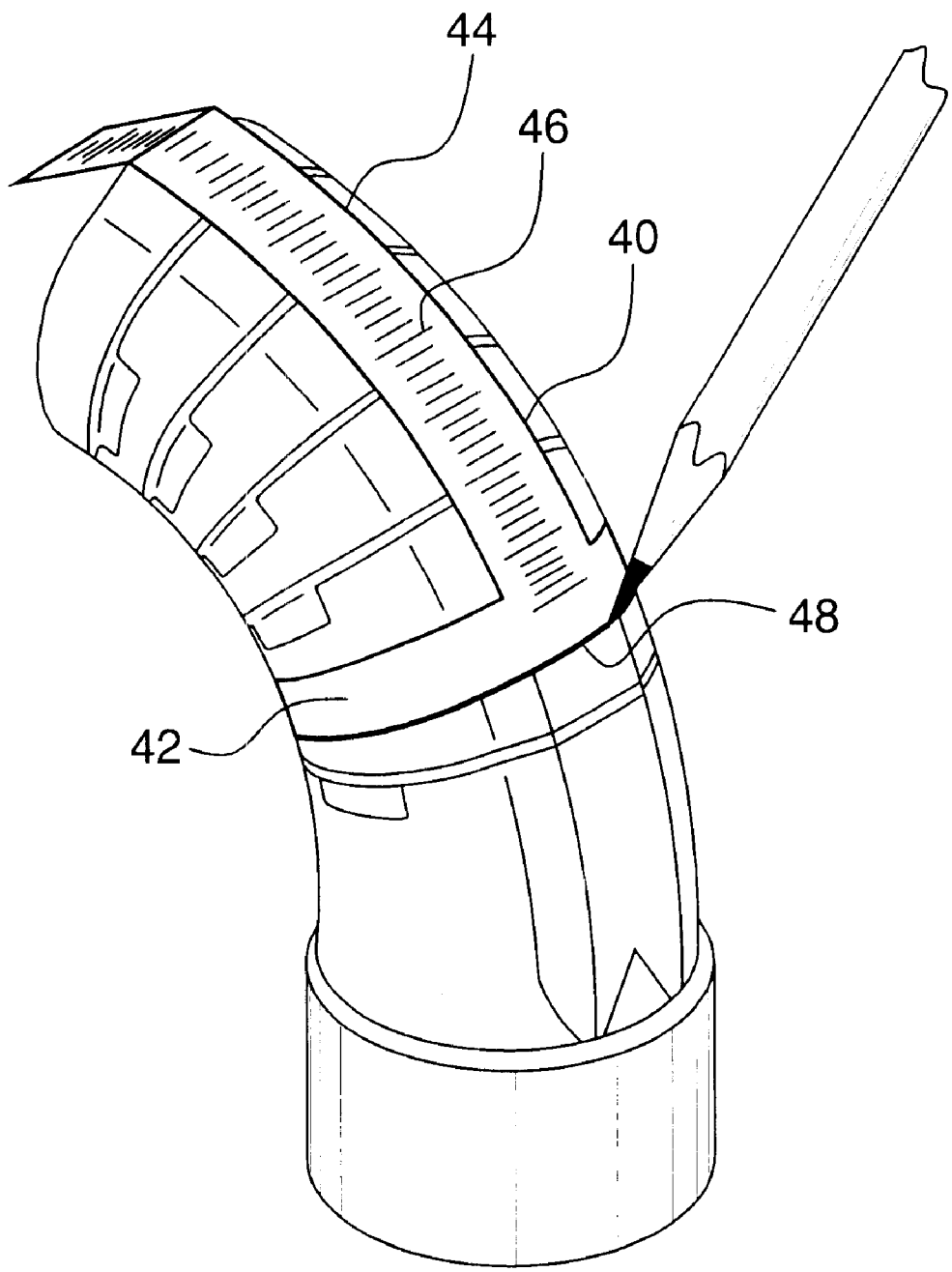
FIG. 5 shows an angle marking tool engaged with part of a selectable angle pipe elbow.

Proper use of the angle marking tool 40 is shown in FIG. 5. The pipe fitter positions the angle marking tool 40 on the first part of the selectable angle elbow, matching the graduation 46 representing the measured angle with the distal end of the first part. In order to easily match the proper graduation 46 with the distal end of the first elbow part, the pipe fitter may fold the measuring strip 44 at the proper graduation. The pipe fitter then presses the remaining length of the measuring strip 44 along the spine of the first elbow part (i.e. the outer surface of the first elbow part which defines the longest arc length). The wrapping strip 44 is then wrapped around the periphery of the first elbow part, each transverse tab of the wrapping strip engaging the elbow part in opposite directions and coming together on the opposite side of the elbow part. The pipe fitter may then use any suitable writing instrument to circumscribe a line around the periphery of the first elbow part using the marking edge 48 as a guide. The circumscribed line constitutes a guide for cutting the first elbow part in order to form the required angle once the two elbow parts are mated.

Figure 6:
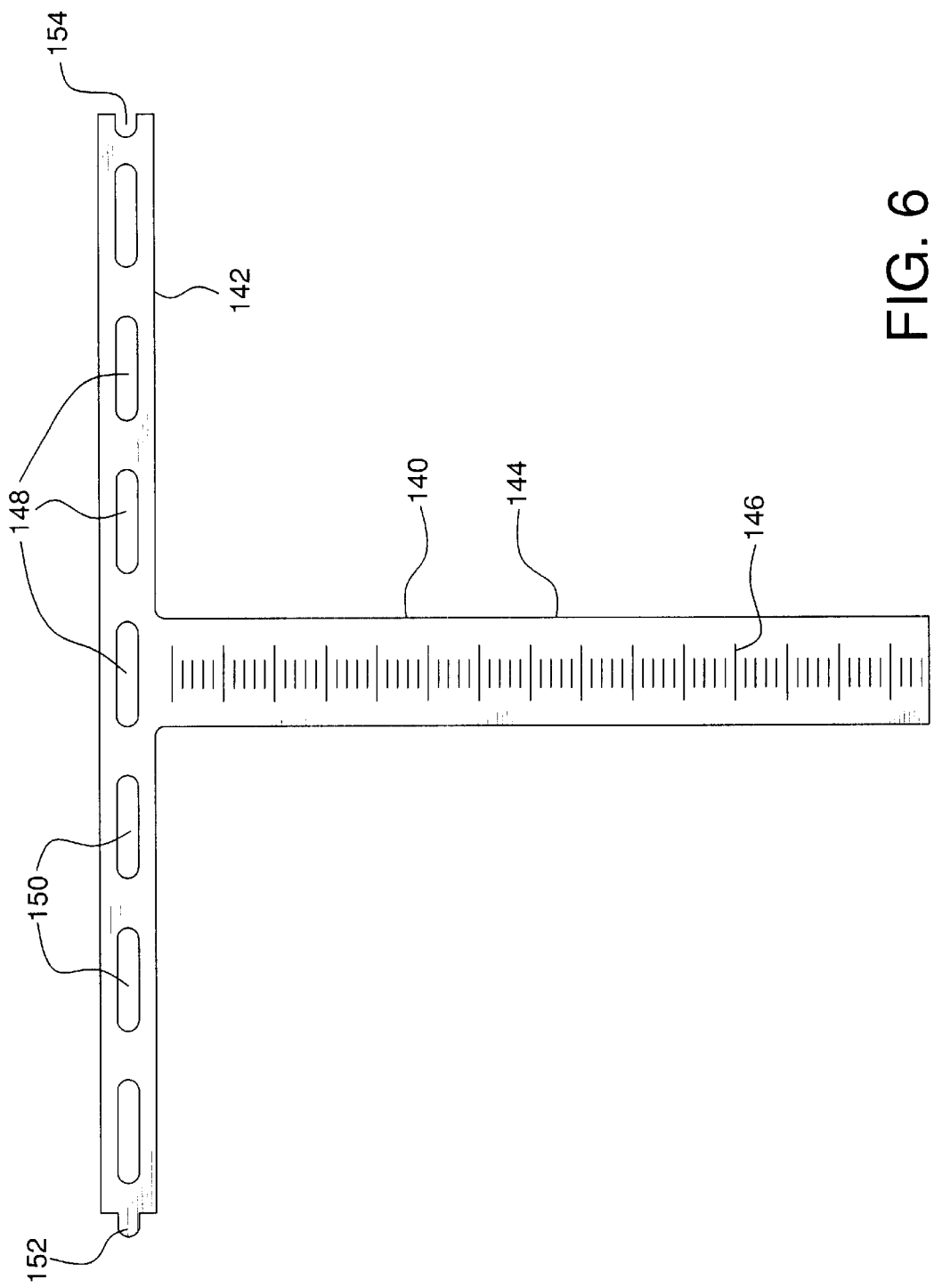
FIG. 6 is a plan view of a second embodiment of an angle marking tool.

FIG. 6 shows an alternative embodiment of an angle marking tool 140. The angle marking tool 140 is similar to angle marking tool 40 shown in FIGS. 4 and 5 in many respects. The marking tool 140 comprises a wrapping band 142, and a graduated measuring strip 144. The graduations on the measuring strip are shown as element 146. The most critical difference between the forms embodied in marking tool 40 and marking tool 140 is the location of the respective marking edges 48, 148. Marking tool 140 is provided with marking edge 148 disposed in a plurality of slots 150 provided longitudinally within the wrapping band 142. The marking edge 148 is defined by the aggregate edges of the slots 150. Slots 150 may be open when acquired by the user. Alternatively, slots 150 may be defined by lines of weakness so that the user can, on her own, easily remove pieces of the substrate to reveal the slots 150. Acceptable techniques for providing lines of weakness include mechanical perforation and laser scoring. Other acceptable techniques for providing lines of weakness are equally well known to those skilled in the art.

The marking band 140 may also be provided with a tab 152 designed for engaging a recess 154 when the marking tool 140 is in use. The marking tool 140 is used in a similar way as marking tool 40. Once a user has engaged wrapping band 142 around the periphery of a pipe part, the user may engage tab 152 with recess 154 to properly align the wrapping band 142. The user then marks the pipe part along marking edge 148. Marking of the pipe part is performed by drawing lines on the pipe through slots 150.

Figure 7:
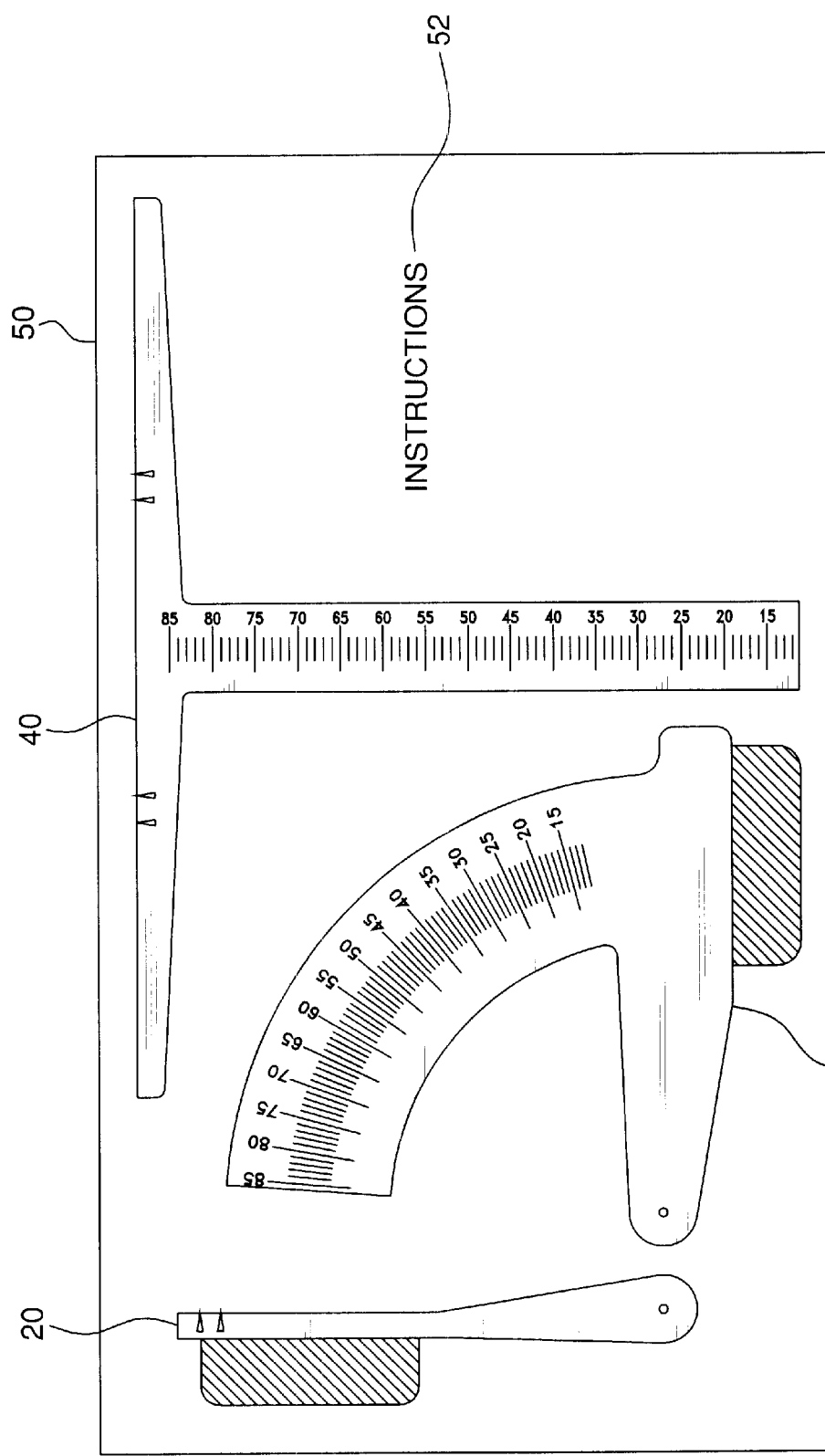
FIG. 7 shows a template from which measuring and marking tools can be created.

FIG. 7 shows a preferred form of the invention in which the tools described above are provided in a kit, the kit comprising a template 50. The template 50 may be formed from any substrate having suitable durability and printability. For reasons set forth above, the substrate must be flexible, yet should retain a substantially planar shape when free of external manipulation. Substrates formed from paper have been found suitable for forming the template 50; paperboards, such as chipboard, being presently preferred. Laminated paper composites are also suitable. Other suitable materials include plastic sheets, cardboards, metal foils and laminates formed from combinations thereof.

Printed on the substrate are images of the tools described above. The images of tools include a measuring slide 20, a measuring base 30, and an angle marking tool 40. (Of course, the alternative embodiment of the angle marking tool 140 may be provided in place of the embodiment described as marking tool 40.) Further, there is preferably provided an area 52 where graphics or other indicia may be printed. The printed indicia can include trademarks, instructions, or decorative designs.

In a preferred from of this embodiment, the tools (measuring slide 20, measuring base 30, and angle marking tool 40, 140) are defined by lines of weakness provided in the substrate through perforation, scoring or any other known technique. Thus, the user can remove the tools from the substrate without a cutting device. If the substrate is not provided with lines of weakness, it is preferable that the substrate be capable of being cut with ordinary scissors.

A pipe fitter may separate the lines of weakness to create the tools from the substrate. If lines of weakness are not provided, the pipe fitter may use ordinary scissors or another suitable cutting instrument to cut out the tools for measuring the required angle between two sections of pipe and for marking the location to be cut on the first part of the elbow. The alignment points 22, 32 of this embodiment comprise circles printed, perforated, or scored on the respective measuring slide 20 and measuring base 30. A pipe fitter may punch a hole through each mark 22, 32 using a nail or any one of many other common objects typically found near construction areas. Once aligned, the user may place the nail, or any other ordinary elongated element, through both holes 22 and 32, thereby pivotally connecting measuring slide 20 and measuring base 30 to form a complete measuring tool 10, as seen in FIGS. 2 and 3. Once the measuring tool 10 is assembled, the pipe fitter uses the measuring tool 10 and marking tool 40, 140 as described herein.

It is contemplated that the template 50 be inexpensive to manufacture such that it can be provided to purchasers of selectable angle pipe elbows at little or no charge to the purchaser. In this way, the pipe fitter will never find herself in a position of not having the tools to properly measure and mark the required angle within a pipe system.

The present invention may be embodied in other specific forms without departing from the spirit or essential attributes thereof and, accordingly, reference should be made to the appended claims, rather than to the foregoing specification, as indicating the scope of the invention.

What is claimed is:

1. A kit for measuring and marking an angle between two pipes, the kit comprising:
   an angle measuring tool having a measuring slide pivotally connected to a measuring base with radially arranged graduations thereon; and
   an angle marking tool having flexible transverse tabs for engaging a pipe elbow so that graduations thereon position along a spine of the pipe and define an angle.

2. The kit of claim 1 wherein the graduations on the measuring base are on an arcuate segment.

3. The kit of claim 1 wherein the measuring slide and measuring base each have a tab capable of insertion into a standard sized pipe.

4. The kit of claim 1 wherein the angle measuring tool and angle marking tool are printed on a flexible substrate.

5. The kit of claim 4 wherein the flexible substrate comprises paper.

6. The kit of claim 5 wherein the paper is laminated.

7. The kit of claim 5 wherein the paper is paperboard.

8. A pipe angle measuring tool comprising:
   a measuring base and a measuring slide, the measuring base being pivotally connectable to the measuring slide at an alignment point;
   the measuring base and measuring slide each having a projecting tab for insertion into the end of a pipe;
   the measuring slide having a measuring edge; and
   the measuring base having graduations arranged in a radial pattern, the measuring edge corresponding with a graduation representing an angle between a first and second pipe when the measuring base and measuring slide are pivotally attached to one another and the measuring base is placed in contact with the end of the first pipe and the measuring slide is placed in contact with the end of the second pipe.

9. The pipe angle measuring tool of claim 8 wherein the graduations represent angles ranging from about 10 degrees to about 85 degrees.

10. The pipe angle measuring tool of claim 8 wherein the measuring slide and measuring base are made of paper.

11. The pipe angle measuring tool of claim 10 wherein the paper is laminated.

12. The pipe angle measuring tool of claim 10 wherein the paper is paperboard.

13. An angle marking tool comprising:
   a measuring strip having graduations thereon; and
   a flexible wrapping band having at least one transverse tab for engaging a pipe elbow so that the graduations on the measuring strip position along a spine of the pipe elbow and define an angle, the flexible wrapping band being attached to an end of the measuring strip, and the wrapping band having a marking edge formed from longitudinal slots provided in the wrapping band.

14. The angle marking tool of claim 13 wherein the measuring strip is flexible.

15. The angle marking tool of claim 13 wherein the graduations represent angles ranging from about 10 degrees to about 85 degrees.

16. The angle marking tool of claim 13 wherein the measuring strip and wrapping band comprise paper.

17. The angle marking tool of claim 16 wherein the paper is paperboard.

18. A template for measuring an angle between two pipes and marking an appropriate cutting guide on a selectable angle pipe elbow, the template comprising:

a flexible substrate, the substrate having
an image of an angle measuring tool with a measuring base and a measuring slide and
an image of an angle marking tool comprising a graduated measuring strip and a wrapping band, the wrapping band having at least one transverse tab adapted for engaging a pipe elbow so that the graduated measuring strip positions along the spine of a pipe and defines an angle;

wherein the substrate is provided with lines of weakness which can be separated to form a measuring base, a measuring slide and an angle marking tool.

19. The template of claim 18 wherein the flexible substrate comprises paper.

20. The template of claim 19 wherein the paper is paperboard.

21. The template of claim 18 wherein the measuring base and measuring slide can be pivotally connected by an elongated element to form the angle measuring tool, the pivotal connection being made at a marked alignment point on each of the measuring base and measuring slide.

22. The template of claim 18 wherein the measuring base comprises an alignment point, a segment having graduations thereon and a protruding tab adapted to fit into an open end of a pipe, and the measuring slide comprises an alignment point, a protruding tab adapted to fit into an open end of a pipe, and a measuring edge.

23. A template for measuring an angle between two pipes and marking an appropriate cutting guide on a selectable angle pipe elbow, the template comprising:

a flexible substrate, the substrate having
an image of an angle measuring tool with a measuring base and a measuring slide and
an image of an angle marking tool comprising a graduated measuring strip and a wrapping band, the wrapping band having at least one transverse tab adapted for engaging a pipe elbow so that the graduated measuring strip positions along the spine of a pipe and defines an angle;

wherein the images of the measuring base, measuring slide and angle marking tool can be cut out from the flexible substrate using scissors in order to form a measuring base, a measuring slide and an angle marking tool.

24. The template of claim 23 wherein the measuring base and measuring slide can be pivotally connected by an elongated element to form the angle measuring tool, the pivotal connection being made at a marked alignment point on each of the measuring base and measuring slide.

25. The template of claim 23 wherein the measuring base comprises an alignment point, a segment having graduations thereon and a protruding tab adapted to fit into an open end of a pipe, and the measuring slide comprises an alignment point, a protruding tab adapted to fit into an open end of a pipe, and a measuring edge.

* * * * *